United States Patent
Herbert et al.

[15] 3,680,895
[45] Aug. 1, 1972

[54] FLEXIBLE JOINT MEANS
[72] Inventors: John T. Herbert; Paul E. Sullivan; Stanley P. Vitt, all of Redlands, Calif.
[73] Assignee: Lockheed Aircraft Corporation, Burbank, Calif.
[22] Filed: Nov. 24, 1969
[21] Appl. No.: 879,206

[52] U.S. Cl. ................285/167, 285/223, 285/261, 285/DIG. 1
[51] Int. Cl. .............................................. F16l 27/04
[58] Field of Search.....287/85 A, 87, 85 R; 285/223, 285/224, 230, DIG. 1, 261, 263, 166, 167; 64/11; 308/2, 26, 237

[56] References Cited

UNITED STATES PATENTS

| | | | |
|---|---|---|---|
| 1,782,484 | 11/1930 | Spencer et al. | 285/167 |
| 2,760,359 | 8/1956 | Wildhuber | 64/11 X |
| 3,504,902 | 4/1970 | Irwin | 285/223 X |

FOREIGN PATENTS OR APPLICATIONS 928,384   5/1955   Germany ......................285/261

Primary Examiner—Dave W. Arola
Attorney—George C. Sullivan and Keiichiro Imai

[57] ABSTRACT

An omnidirectionally flexible joint for fluid conduits subject to high pressures and axial loads. The joint employs a pair of annular flexure and seal assemblies disposed in opposing relationship between an inner and an outer housing. The assembly has a resilient flexure element generally in the shape of a hollow spherical segment which is adapted to be bonded to ball and socket surfaces adjacent the inner and outer housings. The assembly further has a resilient shear element which extends generally in the direction of the longitudinal axis of the joint. This shear element is adapted to yield to axial tensile loads applied to said joint and thereby avoid having such loads transmitted to the flexure element, which might otherwise cause failure of the joint.

9 Claims, 5 Drawing Figures

INVENTORS
JOHN T. HERBERT
PAUL E. SULLIVAN
STANLEY P. VITT

FIG_3

FLEXIBLE JOINT MEANS

BACKGROUND OF THE INVENTION

1. Field of the Invention

This invention relates to an omnidirectionally flexible joint for fluid conduits and particularly to a joint subject to high internal and external pressures, high axial loads, and severe operating conditions.

A typical application for the present joint is found in the case of riser lines used for offshore petroleum exploration and drilling. Typically, these lines extend for many feet from a surface vessel to the ocean floor and are subjected to internal and external fluid pressures and to movement caused by wave and current action. These conditions require that the pipe lengths be joined by a coupling member which can be readily flexed under pressure and which can withstand the abrasive action of fluids, tools, and other material being conducted through the lines.

2. Description of the Prior Art

A typical flexible joint now used for petroleum work consists essentially of an inner ball member having a spherical surface and an outer socket member having a complementary spherical surface. The joint is flexed by sliding one of the spherical surfaces with respect to the other and the joint is sealed with resilient O-rings between the sliding surfaces and elsewhere. In usage of these ball joints, it has been found that their flexure movement is impaired when subjected to high pressures, requiring, in some cases, the use of other devices to counteract the pressures involved. These joints are also subject to frictional wear and deterioration of the sliding surfaces and seals and therefore must be frequently repaired or replaced.

Another flexible joint, previously proposed, consists of a pair of annular flexure elements which are disposed in opposing relationship between ball and socket surfaces found, respectively, on inner and outer housings of the joint. These elements provide the flexure movement for the joint and also function as seals for the joint. This joint contains no moving parts and thus is not subject to the frictional wear encountered with the previously described ball joints. However, upon exposure to high pressures and axial loads, it has been found that the flexure elements have a tendency to rupture and fail.

SUMMARY OF THE INVENTION

To solve the problems encountered with the joints of the prior art, the present invention provides a joint having a pair of annular flexure and seal assemblies, each assembly being disposed in opposing relationship between an inner and an outer annular housing. These assemblies permit flexure movement of the two housings relative to each other, provide sealing for the joint, and also are adapted to withstand the internal and external pressures and axial loads encountered by the joint.

More specifically, each flexure and seal assembly has a rigid annular element with a spherical surface, which may be a ball or socket surface and a longitudinally extending cylindrical surface. Adjacent to the rigid element is an annular flexure element which is generally in the form of a hollow spherical segment having inner and outer spherical surfaces. One of these surfaces is bonded to the spherical surface of the rigid element and the other is bonded to a second rigid element having a second spherical surface complementary to that of the rigid element. Thus, the second spherical surface may be either a ball or socket surface.

The flexure and seal assembly also has an annular resilient shear element which extends generally in the direction of the longitudinal axis of the joint. This shear element is attached to the cylindrical surface of the first rigid element and to one of the housings in such manner as to yield to any axial tensile loads which might be encountered during use of the joint. This yielding of the shear element avoids axial stretching of the flexure element, which would otherwise be necessary to cope with the axial tensile load. It has been found, in connection with the similar prior art joint previously described, that this axial stretching of the flexure element leads to rupture and failure when the tensile loads become high. The presence of the shear element in the present invention provides a joint which is capable of withstanding high loads and it is this feature which primarily distinguishes the present joint from the prior art joint.

Other features and advantages of the present invention will become more apparent from the following detailed description of typical forms and applications of the invention taken in conjunction with the accompanying drawings.

DESCRIPTION OF THE PREFERRED EMBODIMENTS

Figure 1:
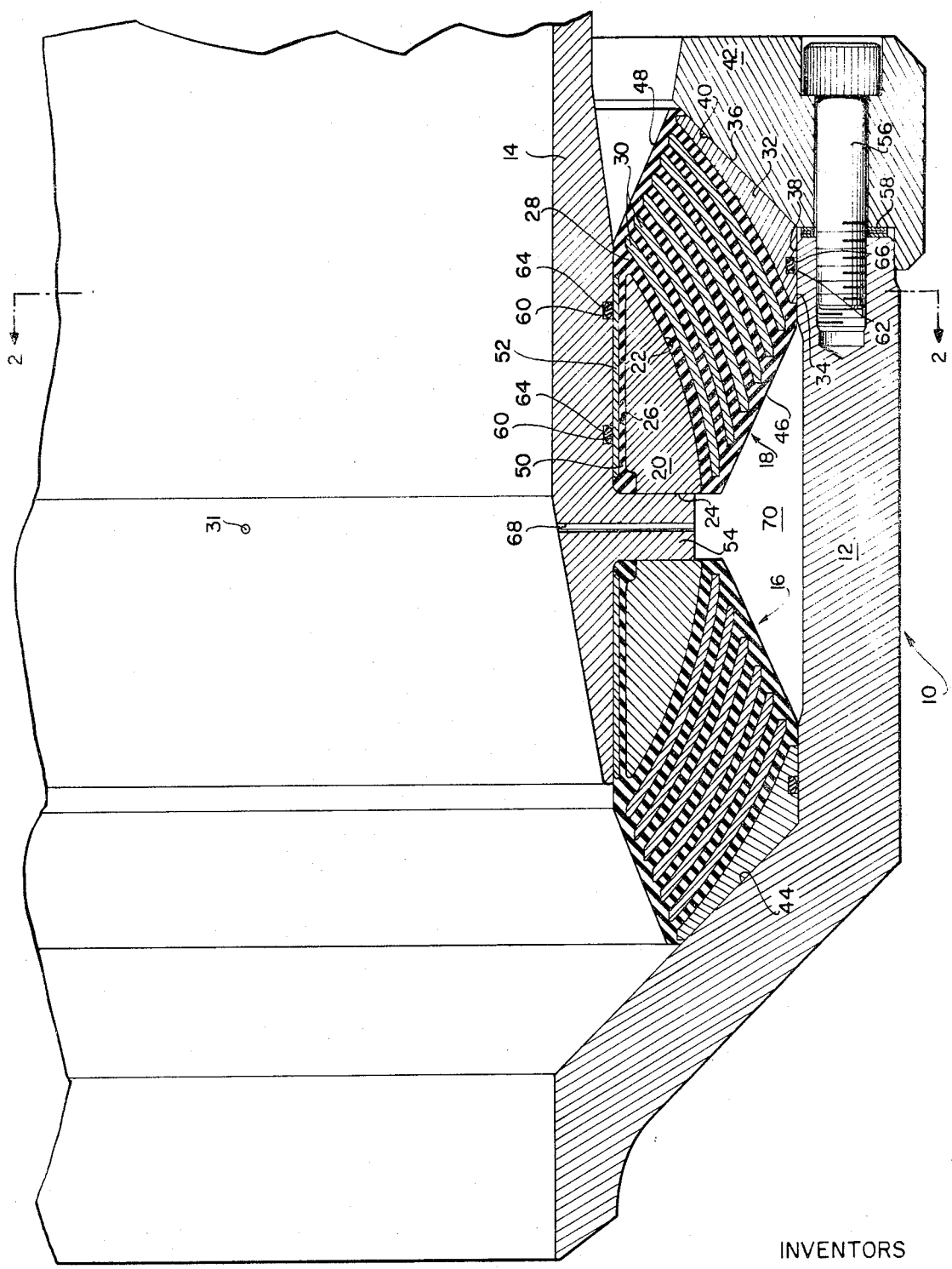
FIG. 1 is a fragmentary, side elevational view, partly in section, of one embodiment of the present invention.
Figure 2:
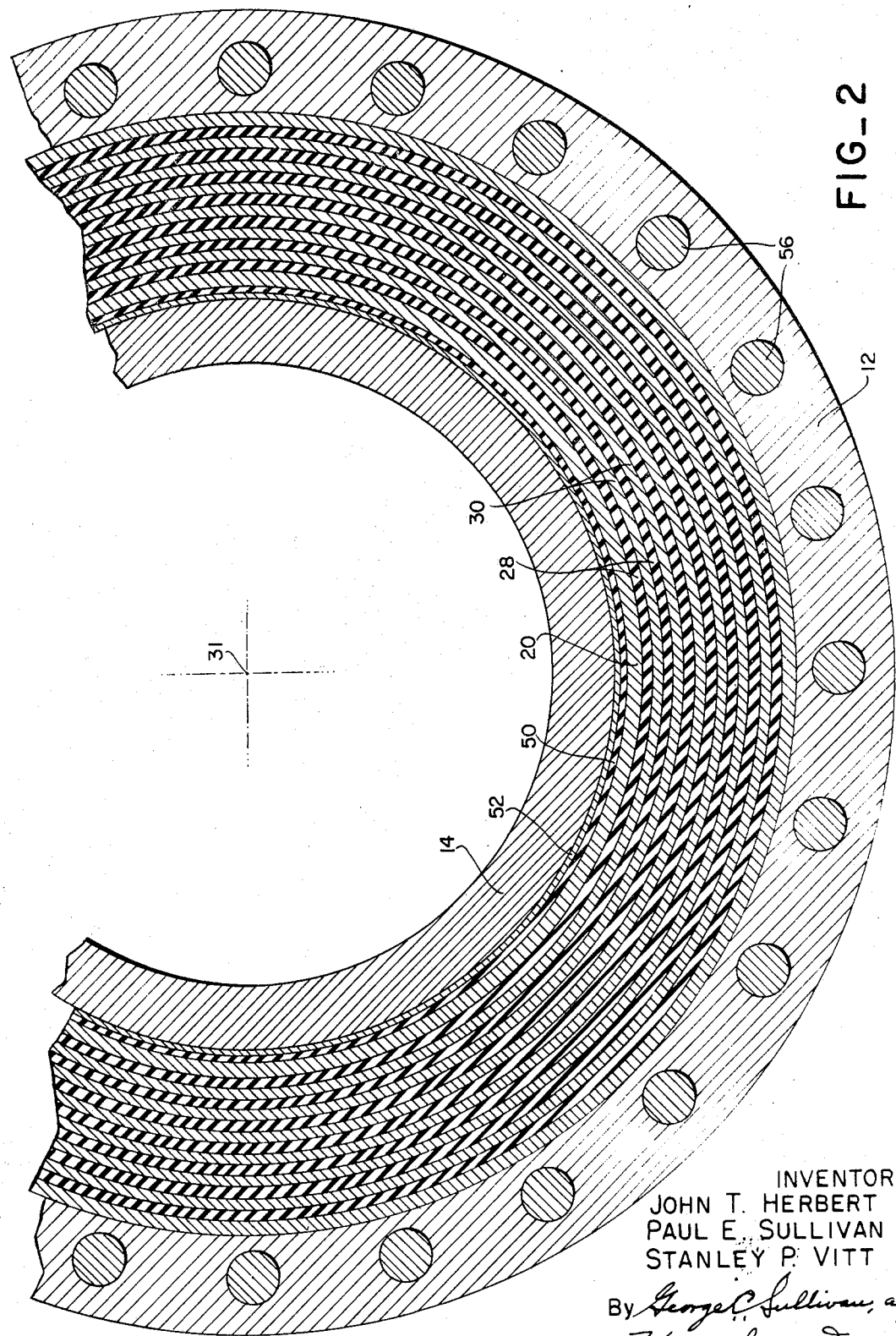
FIG. 2 is a fragmentary, end elevational, sectional view of the joint shown in FIG. 1 taken along the line 2—2.

FIG. 1 shows the present joint 10 having an annular outer housing 12, an annular inner housing 14 partially submerged in housing 12, and annular flexure and seal assemblies 16, 18 disposed in opposing relationship between the two housings. Housings 12 and 14 are attached, generally by welding, to fluid conduits (not shown) having the same diameters. Joint deflection occurs with the flexure of the assemblies 16, 18, which contain resilient material, and the consequent movement of inner housing 14 with respect to outer housing 12.

Flexure assemblies 16, 18 are substantially identical in structure, and consequently only assembly 18 will be described in detail. Assembly 18 includes a rigid annular element 20 having a spherical surface 22, planar surface 24, and cylindrical surface 26. Disposed outwardly from spherical surface 22 is a flexure element comprised of alternate layers 28, 30 of a resilient material and a relatively rigid reinforcing material, said layers being generally in the form of hollow spherical segments and having the same sphericity, or a common center of curvature 31, as surface 22. The outermost reinforcing segment 32 also has planar surfaces 34, 36 adapted to conform respectively to the inner cylindrical wall 38 of housing 12 and to the conical wall 40 of retaining collar 42 which is attached to housing 12. The latter housing also has a conical wall 44 which has the same angle of slope as wall 40 so that assembly 16 can be placed against it. Assembly 18 also has sloping surfaces 46, 48, which assure clearance from the adjacent housing walls during flexure of the joint.

Disposed adjacent to surface 26 of element 20 and bonded thereto is a longitudinally extending cylindrical layer 50 of resilient material adapted to yield to axial tensile loads in a manner to be more specifically described in connection with FIG. 5. Adjacent to layer 50 and bonded thereto is a rigid sleeve 52 which facilitates the placement of the seal assemblies in the joint or their removal from the joint.

Flexure assemblies 16, 18 are designed to be made as integral units separate and apart from the housings, and then later placed within the housings, as shown. This permits replacement of these assemblies in the field, if this should become necessary. These assemblies can be made, for example, by positioning rigid element 20, segments 30, 32 and sleeve 52, all of steel, in a suitable mold and then pouring a resilient material, such as a polyurethane casting compound, into the spaces between the steel parts. The casting compound is then cured in known manner to produce the integral unit.

The flexure assemblies are placed between the housings, as shown, with surface 24 of element 20 resting against flange 54 on housing 14. Retaining collar 42 is then attached to housing 12 with suitable fasteners 56 to secure the assemblies in place. Shims 58 may be used between collar 42 and housing 12 to adjust the compressive load on the assemblies.

Additional sealing around assembly 18, which is exposed to external fluids, is provided by resilient O-rings 60, 62, placed in grooves 64 in housing 14 adjacent to sleeve 52 and in groove 66 placed in layer 32. Unlike the O-rings found in the conventional ball joints which are exposed to moving parts, these O-rings are static and therefore not subject to frictional wear.

It will be noted that, in use of the joint, surface 48 of assembly 18 is exposed to external fluid pressure and surface 48 of assembly 16 is exposed to internal fluid pressure. In order to equalize the imbalance of pressures on the assemblies, holes 68 may be provided at appropriate places in housing 14 through flange 54, which will permit internal fluid to enter cavity 70 formed by housing wall 38 and sloping surfaces 46. The fluid in cavity 70 equalizes the pressure on surfaces 46 and 48 of assembly 16 and helps to offset the external pressure on surface 48 of assembly 18. Alternatively, cavity 70 may be filled with an inert flexible filler such as grease or foam. For low pressure uses of the joint, holes 68 may be dispensed with.

The operation of the present joint can be best described in connection with FIG. 5 wherein parts performing the same function as those described in the above embodiment are identified by the same reference numeral, although they may not be of the same configuration. FIG. 5 shows the present joint in schematic form and illustrates the operation of the joint when subjected to an axial tensile load, a critical operating condition.

When the present joint is pressurized by fluid flowing therethrough or is acted on by a large end load such as the hanging weight of a long length of pipe, the joint is subjected to axial tensile forces tending to pull the joint apart; i.e., inner housing 14 is pulled in one direction and outer housing 12 is pulled in the opposite direction. This condition puts seal assembly 18 under compression between flange 54 and collar 42, and the consequent axial movement of housing 14 causes seal assembly 16 to become slightly separated from flange 54, leaving space A therebetween. Space A is shown greatly exaggerated, the actual distance in practice being on the order of about 0.020 to 0.030 inch. The axial movement also puts resilient layer 50 into a shear condition, and the latter stretches or yields to accommodate the movement. This yielding of layer 50 avoids transmission of the axial loads to resilient material 28 and the consequent stretching of the material in tension to compensate for the axial movement. It has been found, in the case of the prior art joint, that this stretching of resilient material 28 in tension leads to failure where the axial loads are high or where there is repeated and continued stressing under relatively low loads. However, with the addition of the shear element to yield to these loads, it has been found that the present joint will withstand internal pressures as high as 9,000 pounds per square inch without failure. The presence of pressure equalization openings 68, whereby internal fluid is permitted to enter cavity 70 and opening A, also assures that resilient material 28 is not stretched in tension but remains in compression.

Flexure of the present joint occurs through shearing action of the resilient material. Therefore, even when the joint is highly pressurized, the present joint will remain flexible because the shearing action is independent of any compressive forces which might be applied to the material.

Internal housing 14 may be provided with a bevelled end surface 15, which will maintain the opening in the joint at its maximum diameter even when the joint is flexed. This facilitates clear passage of servicing and cleaning tools through the joint.

Figure 5:
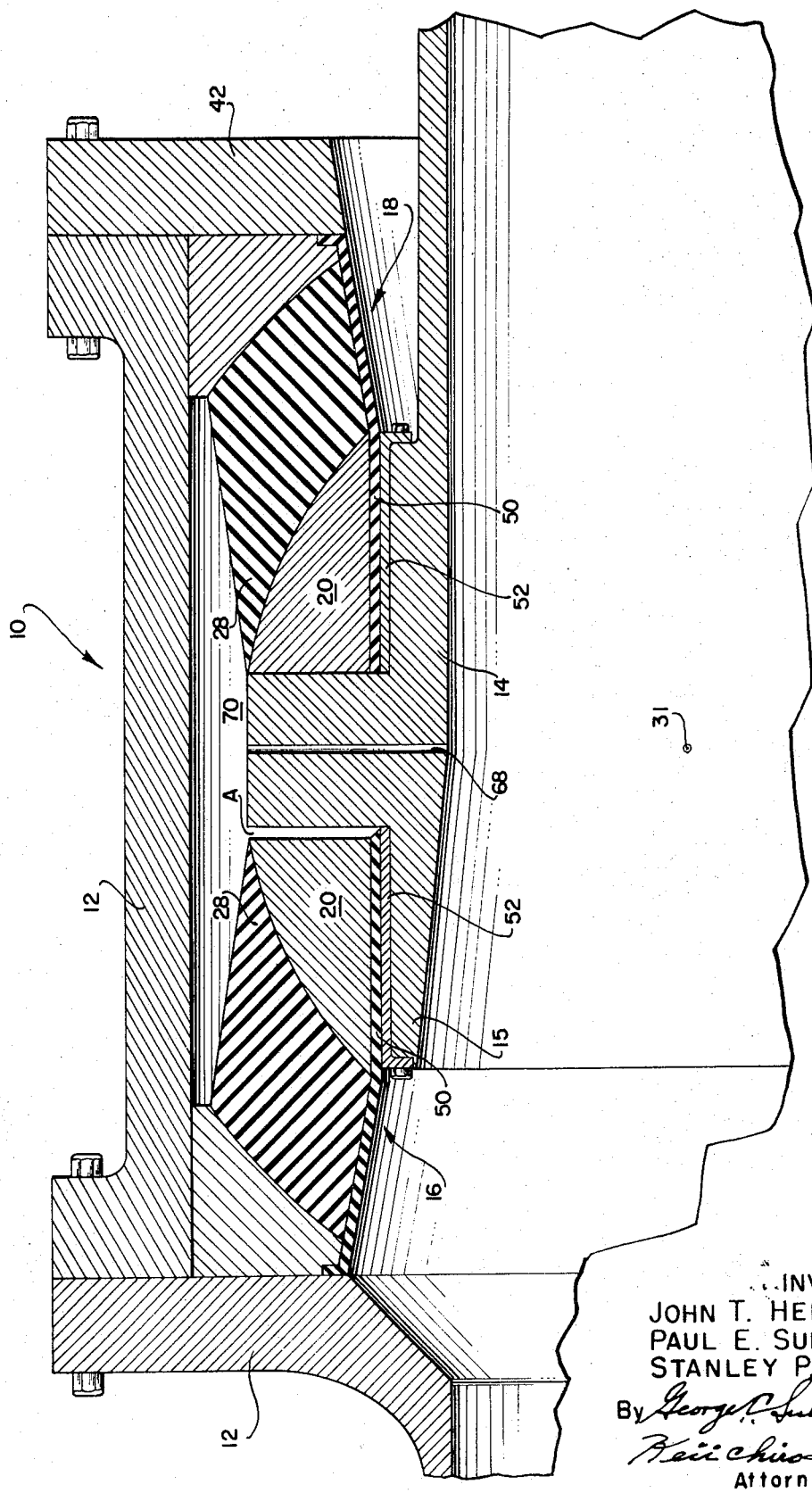
FIG. 5 shows the present joint in schematic form for purposes of illustrating the operation of the joint when subjected to axial tensile loads.

Resilient material 28 is shown schematically in FIG. 5 without any particular reinforcement, for simplicity's sake. In practice, the resilient material may be a natural or synthetic rubber or other elastomer such as polyurethane, polysulfide, nitrile, neoprene, butyl, and ethylene propylene. The reinforcing material may be any relatively rigid material having a higher modulus of elasticity than the resilient material, such as reinforced plastic, titanium, aluminum, steel and other metals. Other reinforcing materials, such as chopped glass fiber rovings, glass fiber cloth, silica fibers, and metal fibers, may also be used, dispersed at random in the resilient material.

The term "fluid", as used herein, includes both liquids and gases.

Figure 3:
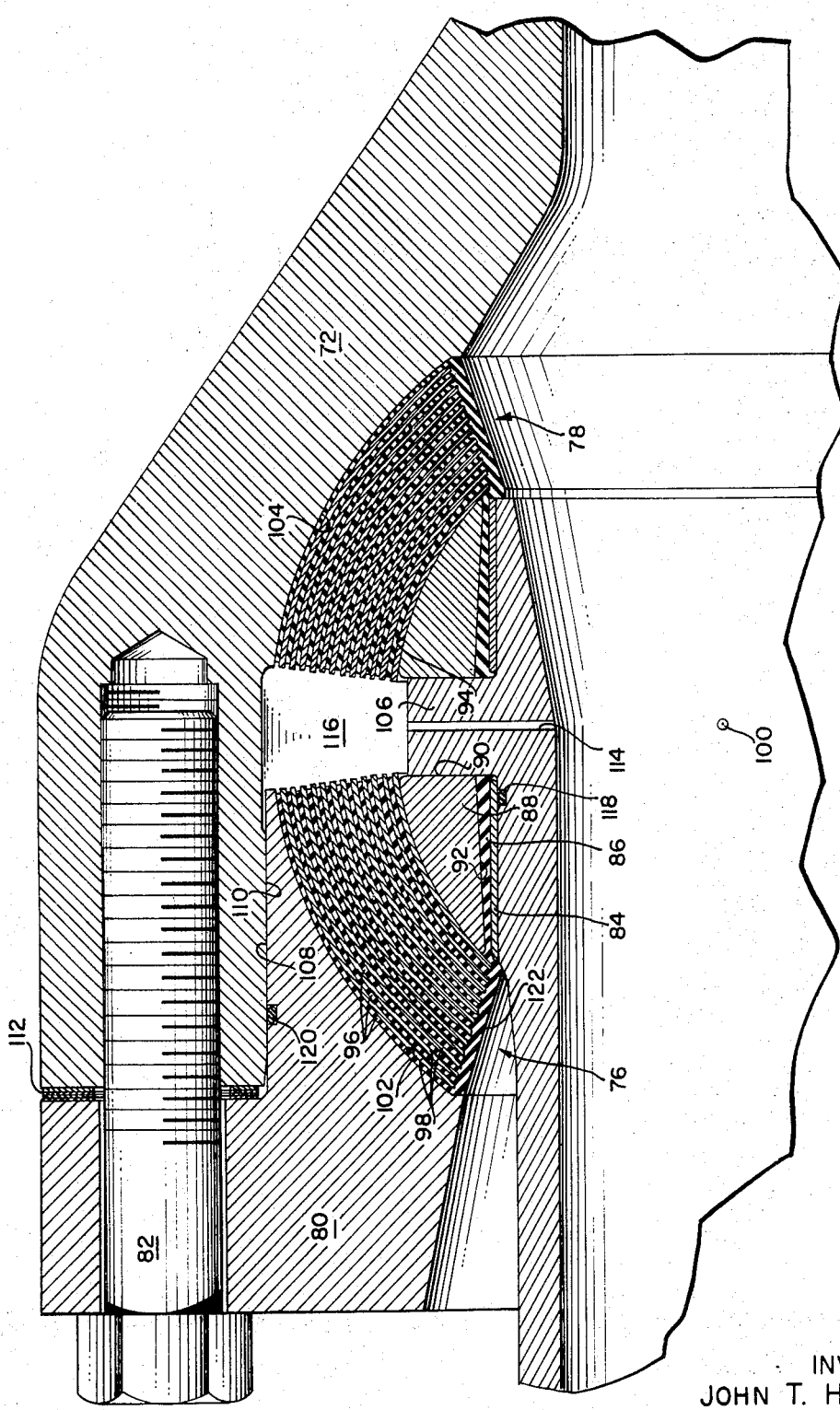
FIG. 3 is a fragmentary, side elevational view, partly in section, of another embodiment of the present invention.

FIG. 3 shows a second embodiment 71, of the present joint including an annular outer housing 72, an annular inner housing 74, a pair of flexure and seal assemblies 76, 78 disposed between the two housings and retained by a cover plate 80. The latter is attached to housing 72 by suitable fasteners 82. Flexure assemblies 76 and 78 are substantially identical and are each comprised of a sleeve 84; an annular longitudinally extending resilient layer 86 wedge-shaped in cross section; a rigid element 88 having a planar surface 90, a frusto-conical surface 92, and a spherical surface 94; alternate layers 96, 98 of a resilient material and a relatively rigid material having the same sphericity, or common center of curvature 100, as spherical surface 94. The wedge shape of layer 86 minimizes the effect of shrinkage during cure and of any localized bond failure along the interfaces with element 88 and sleeve 84.

The principal difference between this embodiment and the previous embodiment is the fact that the outermost ball surfaces of flexure assemblies 76, 78 are bonded respectively to the internal socket surfaces 102, 104 of retaining cover plate 80 and outer housing 72, respectively. This precludes removal and replacement of these assemblies in the field, but results in a joint which is more economical to manufacture than the first embodiment.

Joint 71 is further assembled by abutting flange 106 of housing 74 against assembly 78 bonded to housing 72 and then bringing cover plate 80 with assembly 76 bonded thereto into attaching position with housing 72. Plate 80 has an undercut surface 108 adapted to slide along the inner wall 110 of housing 72. Any adjustments required after seal assembly 76 abuts against flange 106 may be made by means of shims 112 between cover 80 and housing 72. Additional sealing of the joint is provided by resilient O-rings 118 and 120 placed respectively in housing 74 adjacent to sleeve 84 and in cover plate 80 adjacent to wall 110 of housing 72. To help equalize the pressure on the exposed surface 122 of the seal assemblies, openings 114 are provided in housing 74 through flange 106 to admit fluid from the interior of housing 74 to cavity 116 formed between the seal assemblies.

The function and operation of the joint parts enumerated above are essentially the same as those described in connection with the first embodiment and FIG. 5 and therefore will not be further described.

Figure 4:
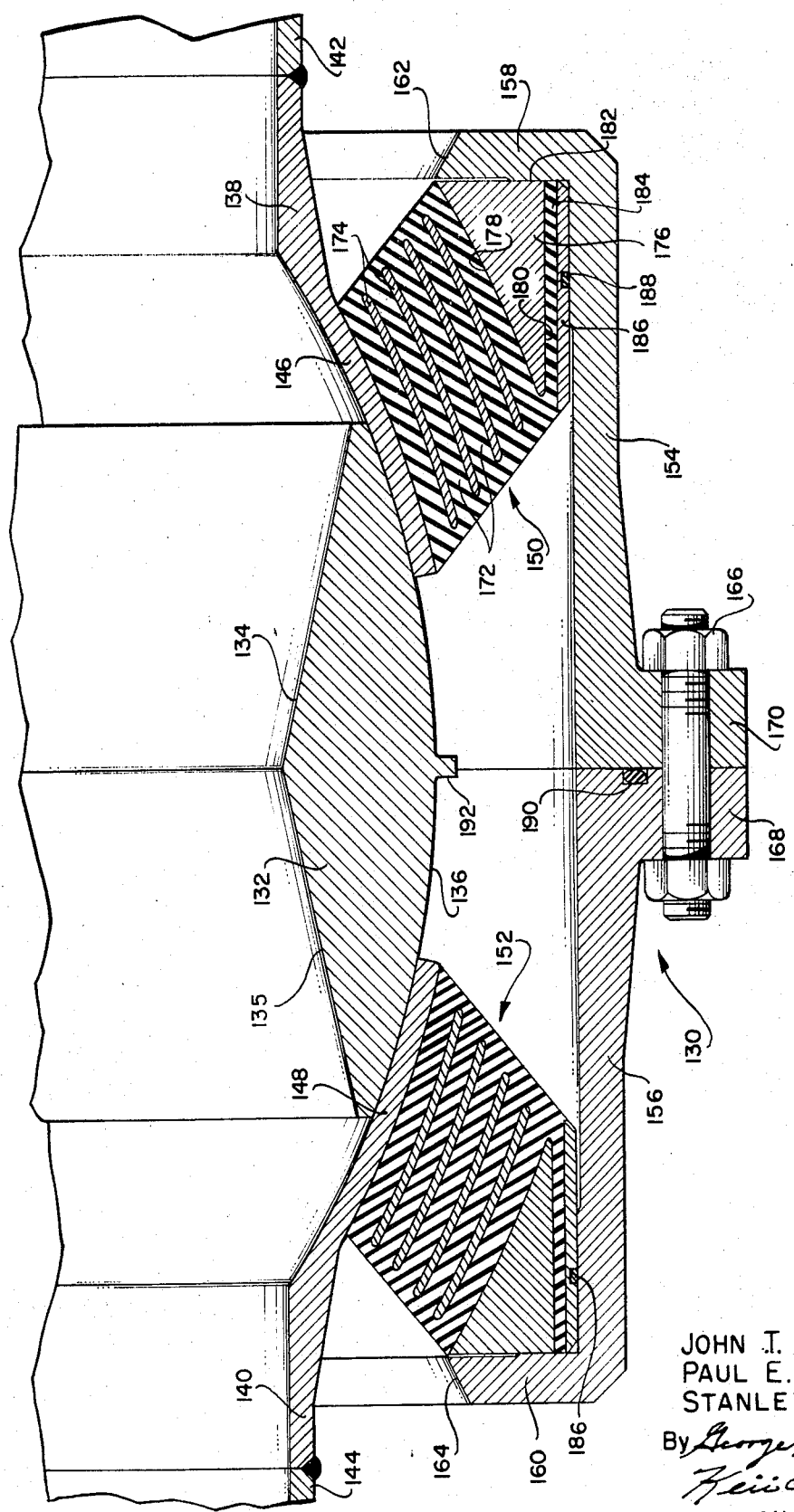
FIG. 4 is a fragmentary, side elevational view, partly in section, of still another embodiment of the present invention.

FIG. 4 shows a third embodiment 130 of the present joint. In this embodiment, a central ball element 132 having inner frusto-conical surfaces 134, 135, and an outer spherical surface 136 serves as the basis for separate and independent deflecting movements of inner housings 138 and 140 attached to fluid conduits 142 and 144 as by welding. Housings 138 and 140 have socket end portions 146, 148 adapted to slide over spherical surface 136. Annular flexure and seal assemblies 150, 152 are bonded to the exterior of the socket end portions 146, 148 and are retained by outer housings 154, 156. These housings have end plates 158, 160 with clearance openings 162, 164 and are joined together at the center of the joint by fasteners 166 placed in mating flanges 168, 170.

As in the previous embodiments, flexure assemblies 150, 152 are identical and consequently only assembly 150 will be described in detail. Assembly 150 has alternate layers 172, 174 of a resilient material and a relatively rigid material in the form of hollow spherical segments having the same sphericity as ball element 132 and a rigid element 176 with a spherical surface 178, a cylindrical surface 180, and a planar surface 182. Bonded to the cylindrical surface 180 is a longitudinally extending layer 184 of resilient material and bonded to layer 184 is a rigid sleeve 186. In addition to the seals provided by the flexure assemblies, the present joint is further sealed with static O-rings 188, 190.

As previously described, flexure movement of the present embodiment is obtained by sliding the socket surfaces of housings 138, 140 over spherical surface 136 of ball element 132. However, the respective sliding surfaces need not be highly machined surfaces, as in the case of the conventional ball joint, because the joint is not sealed at these surfaces. There may even be a slight gap between these surfaces. Thus, ball element 132 functions primarily as a guide for the socket end portions 146 and 148. Any rotational movement of element 132 induced by the flexure movement of these end portions is limited by an annular flange 192 on element 132.

The primary advantage of this embodiment over the previous embodiments is provided by the fact that the two housings 138, 140 can be deflected simultaneously to produce a given joint deflection. This means that the load on each seal assembly is cut into half of that required to achieve the same joint deflection with the first and second embodiments. This results in lower operating stress on each of the seal assemblies in the present embodiment and consequently a longer service life.

Other variations and modifications of the present invention will be obvious to those skilled in the art and it is intended to cover in the appended claims all such modifications and equivalents as fall within the true spirit and scope of this invention.

We claim:

1. A flexible joint for fluid conduits comprising:

first and second annular inner housings in opposing relationship; a central apertured spherical ball element disposed between said housings, said element having an exterior spherical surface;

socket end portions on said housings adapted to slide over the spherical surface of the ball element; first and second annular outer housings each having centrally apertured end plates;

first and second annular flexure assemblies being disposed in opposing relationship between said socket end portions and said outer housings and providing for omnidirectional flexure movement of each of said inner housings, each of said flexure assemblies comprising:

alternate annular layers of a resilient material and a relatively rigid material, said layers having the same sphericity as the ball element, the innermost and outermost layers being of a resilient material, said innermost layer being bonded to said socket end portion;

a rigid element having a spherical surface bonded to the outermost resilient layer and having a cylindrical surface adjacent to the outer housing; an annular, longitudinally extending, resilient shear element bonded to said cylindrical surface of said rigid element and affixed to said outer housing in such manner that said shear element can yield in shear to axial tensile loads applied to said joint;

and means for joining said outer housings to retain the flexure assemblies against the end plates.

2. A flexible joint according to claim 1, wherein the spherical ball element has an annular protuberance on its spherical surface to limit the rotational movement of said ball element with respect to said socket end portions.

3. A flexible joint for fluid conduits comprising:
an annular, outer housing means;
an annular, inner housing;
an externally projecting flange on said inner housing; inner and outer annular flexure assemblies disposed between said housings and against the flange in opposing relationship, each of said assemblies comprising:
  an annular rigid element having a substantially cylindrical surface adjacent to the inner housing, a spherical ball surface, and a planar surface abutting the flange;
  a reinforced resilient element substantially in the form of a hollow spherical segment, said resilient element having a first and a second spherical surface, said first surface being bonded to the spherical surface of said rigid element and said second surface being retained by the outer housing means; and an annular, longitudinally extending, resilient shear element bonded to the cylindrical surface of said rigid element and affixed to the inner housing in such manner that said shear element can yield in shear to axial tensile loads encountered by said joint and thereby avoid placing said loads on the reinforced resilient element.

4. A joint according to claim 3, wherein said outer housing means includes a centrally apertured cover plate retaining the second spherical surface of the resilient element in the outer flexure assembly.

5. A joint according to claim 3, wherein said outer housing means includes a centrally apertured cover plate having a socket surface which is bonded to the second spherical surface of the resilient element in the outer flexure assembly.

6. A joint according to claim 3, wherein pressure equalization openings are provided in the inner housing through the flange to a cavity formed between the assemblies.

7. A joint according to claim 3, wherein a sleeve substantially coextensive with said shear element is disposed between said element and the inner housing, said element being bonded to said sleeve and said sleeve being affixed to said inner housing.

8. A joint according to claim 3, wherein the reinforced resilient element comprises alternate layers of a resilient material and a relatively rigid reinforcing material, said layers having the same sphericity as the spherical surface of the rigid element.

9. A flexible joint means for fluid conduits comprising:
an annular inner housing;
an annular outer housing;
a ball member disposed adjacent said inner housing;
a socket surface in said outer housing, said socket surface being complementary to a ball surface on said ball member;
a flexure element substantially in the form of a hollow spherical segment, said element being bonded to said ball and socket surfaces;
and a resilient shear element interposed between and affixed to said ball member and said inner housing in such manner that said element can yield in shear to joint axial tensile loads and thereby avoid placing said loads on the flexure element.

* * * * *